Patented Apr. 11, 1950

2,503,695

UNITED STATES PATENT OFFICE 2,503,695

METHOD FOR PRODUCING SOLIDS CONCENTRATE FROM FRUIT AND VEGETABLE JUICES AS WELL AS OTHER SOLUTIONS

Robert E. Webb and Frederick W. Bedford, Dunkirk, N. Y., asignors to Bedford Products, Inc., a corporation of New York No Drawing. Application December 3, 1948, Serial No. 63,444

14 Claims. (Cl. 99—205)

This invention relates to a method, employing freezing, for producing concentrates of the solids of fruit and vegetable juices as well as other solutions. For the sake of facility in describing the method, specifically grape juice is used as an example in the following specification, it being understood that the scope of the invention extends to embrace any solution or suspension to which the method is applicable.

Various type of processes are known for the concentration of juices and aqueous solutions generally, to recover the dissolved substances or to remove excess water, such as by evaporation either at atmospheric pressure or under vacuum, or by freezing the solution whereby water crystallizes out as ice in nearly pure state, the soluble solids becoming more concentrated in the water which remains unfrozen, and which are then separated from the ice mass by centrifugal or other means.

Concentration by evaporation has the disadvantage that some substances change during such evaporation, or if a flavor is to be concentrated, some or all of it is lost.

No commercially practical method of concentration by freezing methods has, up to the present invention been developed. Flavors or other delicate compounds have been saved, but such methods have been too costly, too slow, or too much of the desired product has been lost. The last objection has been hard to overcome, since as more heat is extracted from the mass, it will cause more water to be frozen out, increasing the density of the unfrozen portion, which becomes viscous and may finally crystallize because the water which dissolved the solids has been separated from the solution. The removal of the viscous or crystalline concentrate from the ice mass has not been satisfactorily accomplished by known methods.

In concentrating fruit juices, for example by freezing, it is not the usual practice to freeze the juice to such a low temperature that would cause the dissolved solids to crystallize out. Freezing is usually carried to the point at which the solids in the unfrozen syrup are three or four times as concentrated as in the original juice. The ice crystals then form a skeletal structure with spaces or interstices which contain the liquid concentrate. These spaces form a maze-like passage through the mass of frozen juice. The concentrate is usually then separated from the ice by centrifuging. If a concentrate containing 35% sugar solids is desired, it is obvious that the temperature of the frozen mass should not be lower than the freezing point of 35% syrup, which is about 20° F. From the economical standpoint, it is impractical to freeze commercial quantities of juice at 20° F., in order to obtain blocks or masses of frozen juice which can be processed without disturbing the laminated structure of the ice crystals, and which directional layering of the ice is important from the standpoint of separating out the concentrate centrifugally. Furthermore, freezing at 20° F., being a relatively slow rate, permits migration of heavier syrup to the bottom and center of the freezing vessel, and results in a weak crystal structure at these points because the freezing point is lowered by this concentration. Under centrifuging the structure collapses and closes off the passages through which the concentrate must escape. The ideal method for such a process would be to lower the temperature as the concentration increases. This, however, is not economical.

When the freezing is done at lower temperatures to shorten the freezing time, those parts of the ice nearest the refrigerating medium naturally attain lower temperatures than the more remote parts. For example, if brine at 0° F. is used as the freezing medium, there will be a "shell" of frozen juice around the block or cake, with a gradient temperature of from 5° to 10° F. The concentrate held in this outer zone will be viscous and jelly-like because of its high concentration and low temperature. In this state it will not readily flow through the passages between the ice crystals, and also will bar the exit of the more fluid concentrate held in the center of the mass.

Washing the ice with thinner solutions or with water to dilute and remove the concentrate adhering to or occupying the interstices between the ice crystals, is difficult because the concentrate and the ice are both much colder than the washing solution, and freezing of the washing liquid takes place. The spaces between the ice are filled with the newly formed ice, which also covers the concentrate which is to be washed off. Methods have been patented for controlling these conditions, such as tempering the whole frozen mass before treatment, or warming the ice before adding a weaker solution with which to wash the ice. Any such method increases the cost by wasting some of the energy expended in freezing to a low temperature, by slowing the process, and causing losses of valuable concentrate.

Slow freezing by various devices to produce larger crystals at higher temperatures, which are washed more easily, have been tried, and have contributed to the general inefficiency of the freezing method for concentration.

Since removal of water by freezing admittedly saves all of the flavor in the concentrate, while evaporation removes the delicate flavors with the water vapor, it is quite evident that a method is much to be desired that will quickly and economically produce a high concentration as well as remove all the concentrate, whether in liquid or crystalline form, from a mass of ice which has been frozen either slowly, or as quickly as possible, and to any practical temperature, without loss of any energy that has been used to freeze the mass, and without loss of concentrate, even though the temperature is relatively low.

The general object of the present invention is to provide a method of processing frozen fruit juices and other solutions in which most of the laborious and ineffective procedures above referred to for separating the concentrate from the ice, as well as for recovering the residual solids in the ice mass, are eliminated or greatly simplified.

The most important feature of this inventive concept and one which obviates the difficulties of other methods, is the manipulation of the frozen juice in the form of a slurry. This is done by finely grinding the frozen juice and mixing it with a sufficient quantity of unfrozen juice or concentrate at a temperature close to its freezing point, making a free flowing slurry which can be pumped or otherwise delivered to a centrifuge.

Slurrying equalizes the temperature of the frozen juice and the slurry liquid without melting ice or requiring the application of external heat beyond that dissipated in grinding and agitation. The heat which raises the temperature of the frozen juice is furnished by the slurry liquid, the temperature of the slurry liquid used being such that the ice mass of the frozen juice is not raised to its melting point. The slurry liquid is cooled by the frozen juice with the consequent result that some water is frozen out of the slurry liquid, raising the density of the concentration of that part of the slurry liquid that remains unfrozen. This is a useful expenditure of the refrigerating capactiy of the frozen juice. Since the temperature of the frozen juice and the slurry liquid becomes the same, there is no freezing of ice against the ice mass of the frozen juice during centrifuging which would occlude the capillary passages in the ice mass of the frozen juice, nor on the concentrate occupying said passages, so that facility of separation remains unimpaired.

Since the frozen juice is finely ground, neither the size of the water crystals nor the nature or condition of the laminated structure of the ice mass is of any moment; therefore, whether the juice has been frozen slowly or rapidly is inconsequential to the process. However, since time is a factor of economy, it is preferred to freeze the juice fast, and since the method contemplates successive steps of slurrying to recover as much as possible of the residual concentrate from the interstices of the ice mass, in each of which steps the ice mass becomes warmer, and as it is undesirable to have any dilution through melting ice, the juice is preferably sub-cooled to such a degree that the entire sequence of steps can be performed within a temperature range not higher than the melting point of water.

The fact that at the lower temperature of freezing the soluble solids may crystallize out or become gummy is of no consequence. Once the temperature has been equalized in the slurry, the solids constituents held by the ice mass go into their normal state of solution and consistency, and readily flow through the spaces between the ice particles upon centrifuging. Each successive slurry, employing more dilute fractions of liquid concentrate than the preceding step, washes off the heavier fractions of concentrate adhering to the particles of the ice mass, and at the same time results in the freezing out of additional water from the slurry liquid in each step, and eventually leaves the ice particles with a minimum and practically negligible amount of adhering fruit solids.

The technique of applying the principles of this invention is not strict. However, to obtain the advantages of the method to the fullest extent, the following conditions should be adhered to:

1. The juice should preferably be frozen so that the temperature of the frozen mass is 0° F. or lower.
2. The frozen mass is finely comminuted.
3. The comminuted mass is slurried with original juice of any practical degree of concentration, using the desired or calculated quantity of each.
4. The slurry liquid is at a temperature near its freezing point.
5. Successive slurries are made by using weaker fractions of liquid.
6. Precautions should be taken to prevent heat pickup from the surroundings. In this connection it will be understood that since the slurry is a freely flowable liquid which can be pumped to the point of separation, it can be conveyed through insulated conduits and protected from atmospheric heat leakage. The only outside heat required in the process is heat employed to melt discard ice to provide weaker slurrying or washing liquors.

A practical example of our method follows: Three tanks may be employed, which for sake of identification will be designated as tanks A, B and C, tank A containing a body of natural grape juice of 15% solids concentrate, from which the batches of juice which are to be frozen may be drawn, and which juice is also available as a slurrying liquid, preferably cooled to a temperature close to its freezing point. The tank B holds at the start the original grape juice used for the first slurry liquid. In later operations, the concentrate is held in this same tank as it is being built up to the desired strength, in this case to 35%. Tank C contains a body of weak slurrying liquid of about 1% solids concentrate.

Step 1.—A quantity of original strength juice of about 15% concentrate is frozen solid (temperature 0° F. or lower), and is finely ground. This is mixed with a quantity of natural juice from tank B close to its freezing point, to form a slurry of flowable consistency. The frozen mass has 60% concentrate of solids adhering to the ice crystals.

The temperature of the frozen mass and slurry liquid is permitted to equalize, or preferably is equalized by mixing. The frozen mass becomes warmer, lowering the viscosity of the adherent concentrate. The slurry liquid becomes cooler, causing some water to be frozen out of the liquid, thus slightly increasing the density of the slurry liquid. This represents useful work resulting from the refrigerating capacity of the frozen mass. Dilution of the adhering concentrate by the slurry liquid takes place during the period of temperature equalization. When the temperature has become equalized, the slurry is centrifuged. Since the temperature of the frozen mass and of the slurry liquid is the same, no ice is frozen over the interstices between the ice particles or over the adhering concentrate. The solution separated by the centrifuge has a concentration of 22% solids, and the residual ice mass has 22% solids clinging to the ice particles. The 22% solution is pumped into tank B.

*Step 2.*—The residual ice mass, at 28° F. (the equalization temperature in the previous step) with adherent 22% concentrate which if melted would test about 3% solids, is reslurried with straight juice at 15% concentration and a temperature of about 29° F. Temperature of the slurry is permitted to equalize, and the slurry is centrifuged, separating a solution of 16% solids, leaving a residual ice mass with 16% concentrate adhering to the ice particles. This separated solution is pumped into tank A.

*Step 3.*—The residual ice mass from Step 2 having 16% concentrate adhering to the ice particles and which if melted would test about 1% solids, at a temperature of about 29° F., which is the equalization temperature of the previous step, is reslurried with 1% juice from tank C at a temperature of about 31° F., or water at just about 32° F. may be used as needed to keep the liquid in tank C at about 1% solids.

It is practical to substitute a washing stage instead of a slurrying step for the last step in the solids recovering process, by spraying the ice water or weak solution upon the ice mass remaining in the centrifuge at the end of the preceding step.

The temperature is permitted to equalize and the slurry centrifuged. The separated solution has a concentration of about 1½% and is returned to tank C. The residual ice mass has 1½% concentrate adhering to the ice particles, which if melted would test about 0.2% solids. This is a negligible solids residue, so that this ice mass is treated as discard ice. A portion may be melted and put into tank C to maintain a 1% solution in said tank.

The above succession of slurrying steps in which the residual ice mass is slurried successively with weaker solutions, describes the treatment of a single frozen batch of juice for the recovery of substantially all the solids therefrom, but it is obvious that the density of the concentrate in tank B, 22%, is considerably below the commercial strength of 35% which it is desired to produce. Therefore, in order to build up the density of the solution in tank B, the above process is repeated through the three phases described below, or more if necessary, until a concentrate of the desired solids content has been obtained.

In the second phase, another batch of juice is frozen and ground. This may be straight 15% juice or juice from the tank A resulting from the first phase which is somewhat stronger than the 15%. The ice mass is slurried with 22% slurry liquid from tank B and after temperature equalization it is centrifuged, a separated solution being obtained having 27% solids, which is pumped to tank B.

For the third phase still another batch of juice of 15% solids concentration or somewhat higher, is frozen, ground, and slurried with the 27% solution from tank B, then centrifuged, a 32% concentrate being separated and returned to tank B, the residual ice mass being then processed down to discard ice, following the teachings of the invention, for recovery of the solids.

For the next phase, a fresh quantity of 15% juice or stronger, is frozen, ground, and slurried with the 32% concentrate, then centrifuged, a slurry liquid being separated of approximately 35% solids. This is returned to tank B, the concentrate in said tank being now of commercial or of any desired strength.

After the concentrate in tank B has attained the desired strength of 35% solids, some may be drawn off for commercial use and replaced by natural juice or juice of any strength desired, to bring the density of the solution down to 32% solids. Thereafter the process is continued by freezing and grinding fresh batches of juice, using 32% solution each time for the first slurry, obtaining 35% concentrate, part of which is contributed to the commercial stock pile, while the rest is diluted down to 32% concentration to provide slurry solution for the next batch.

In the process of recovering the solids from the residual ice mass, water at a temperature slightly above freezing point may be used as the slurry liquid in the last step, since slight melting of the surface of the ice particles has the advantage of washing off adherent traces of the solids, as well as diluting the concentrate, facilitating its separation. The very weak liquor separated therefrom may be returned to tank C and built up to normal 1% concentration by the addition of the proper quantities of juice or one of the stronger solutions.

It is to be understood that when a body of 35% concentrate or of any desired strength has been acquired, the finished concentrate from every batch of frozen single strength juice is of the commercial strength desired, and the process becomes a repeating one of uniform treatments.

While we have in the above description disclosed a practical embodiment of our new method of producing solids concentrates from solutions of said solids, it will be understood by those skilled in the art that within the bounds of its broad concept the technique of carrying out the process may be varied within wide limits and with relation to the nature of the solution being treated, and that the scope of the invention is not limited by the character of the apparatus by means of which it is carried out.

What we claim as our invention is:

1. Method for producing concentrates of solids from solutions of said solids comprising, forming a slurry consisting of a frozen ground mass of solution of said solids the frozen particles carrying adhering concentrate excluded from the frozen solid mass during the freezing process; mixed with a solution of said solids in liquid form, the density of the liquid solution being less than that of the solids concentrate adhering to the frozen particles, the frozen mass being colder than the admixed slurry liquid, permitting the temperature of the slurry constituents to equalize whereby the frozen mass is warmed reducing the viscosity of its adherent concentrate, during the equalization period said concentrate being dissolved in the slurry liquid increasing the density of said slurry liquid, and separating the slurry liquid from the frozen mass.

2. Method for producing concentrates of solids from aqueous solutions of said solids comprising, forming a slurry consisting of a frozen ground mass of solution of said solids the frozen particles carrying adhering concentrate excluded from the ice of the frozen mass, mixed with a solution of said solids in liquid form, the density of the liquid solution being less than that of the solids concentrate adhering to the ice particles, the frozen mass being colder than the slurry liquid and the temperature of both being below the melting point of ice, permitting the temperature of the slurry constituents to equalize whereby the frozen mass is warmed, reducing the viscosity of its adherent concentrate, during the equalization period said concentrate being dissolved in the slurry liquid increasing the density of said slurry liquid, and separating the slurry liquid from the frozen mass.

3. Method for producing concentrates of solids from aqueous solutions of said solids, comprising successive steps, each step consisting of the method as claimed in claim 2, in which the frozen mass of each succeeding step is the residual frozen mass of the preceding step.

4. Method for producing concentrates of solids from aqueous solutions of said solids comprising, forming a slurry consisting of a frozen ground mass of solution of said solids the frozen particles carrying adhering concentrate exluded from the ice of the frozen mass, mixed with a solution of said solids in liquid form, the density of the liquid solution being less than that of the solids concentrate adhering to the ice particles, the frozen mass being colder than the slurry liquid and the temperature of the latter being close to its freezing point, permitting the temperature of the slurry constituents to equalize whereby some water is frozen out of the slurry liquid increasing its density, and whereby the frozen mass is warmed reducing the viscosity of its adherent concentrate, during the equalization period said concentrate being dissolved in the slurry liquid further increasing the density of said slurry liquid, and separating said slurry liquid from the frozen mass.

5. Method for producing concentrates of solids from aqueous solution of said solids, comprising successive steps, each step consisting of the method as claimed in claim 4 in which the frozen mass of each succeeding step is the residual frozen mass of the preceding step.

6. Method for producing concentrates of fruit or vegetable juices comprising, forming a slurry consisting of a frozen ground mass of juice the frozen particles carrying adhering concentrate excluded from the ice of the frozen mass, mixed with a liquid body of juice of less concentration than that of the solids concentrate adhering to the ice particles, the frozen mass being colder than the slurry liquid, the slurry liquid being at sufficiently low temperature so as not to cause appreciable melting of the frozen particles, permitting the temperature of the slurry constituents to equalize whereby the frozen mass is warmed reducing the viscosity of its adherent concentrate, during the equalization period said concentrate being dissolved in the slurry liquid increasing the concentration of said slurry liquid, and separating the slurry liquid from the frozen mass.

7. Method for producing concentrates of fruit or vegetable juices comprising successive steps, each step consisting of the method as claimed in claim 6 in which the frozen mass of each succeeding step is the residual frozen mass of the preceding step.

8. Method for producing concentrates of fruit or vegetable juices comprising, forming a slurry consisting of a frozen ground mass of juice the frozen particles carrying adhering concentrate excluded from the ice of the frozen mass, mixed with a liquid body of juice of less concentration than the solids concentrate adhering to the ice particles, the frozen mass being colder than the slurry liquid and the temperature of the latter being close to its freezing point, permitting the temperature of the slurry constitutents to equalize whereby some water is frozen out of the slurry liquid increasing its density and whereby the frozen mass is warmed reducing the viscosity of its adherent concentrate, and during the equalization period said concentrate being dissolved in the slurry liquid further increasing the density of said slurry liquid, and separating said slurry liquid from the frozen mass.

9. Method for producing concentrates of fruit or vegetable juices comprising successive steps each step consisting of the method as claimed in claim 8 in which the frozen mass of each succeeding step is the residual frozen mass of the preceding step.

10. Method for producing concentrates of fruit or vegetable juices comprising, freezing a body of juice in any manner without regard to the character of the crystalline ice structure produced by the freezing, grinding the frozen mass to a degree of fineness at which the particle size subordinates the natural crystalline structure as a function of the frozen mass in facilitating separation therefrom of the solids concentrate excluded from the ice crystals and which is adherent to the ice particles, slurrying the frozen mass with a liquid body of juice of less concentration than the said adherent concentrate, the frozen mass being colder than the slurry liquid and the temperature of the latter being close to its freezing point, permitting the temperature of the slurry constituents to equalize whereby some water is frozen out of the slurry liquid increasing its density and whereby the frozen mass is warmed reducing the viscosity of its adherent concentrate, and during the equalization period said concentrate being dissolved in the slurry liquid further increasing the density of said slurry liquid, and separating said slurry liquid from the frozen mass.

11. Method for producing concentrates of fruit or vegetable juices comprising successive steps each step consisting of the method as claimed in claim 10 in which the frozen mass of each succeeding step is the residual frozen mass of the preceding step.

12. Method for building up a desired high solids concentrate of fruit or vegetable juices, comprising freezing and grinding a plurality of batches of juice, successively treating the frozen masses thus produced by slurrying each with a liquid body of juice of less concentration than that of the solids concentrate excluded from the ice of the frozen mass and adhering to the ice particles, the frozen mass being colder than the slurry liquid and the temperature of the slurry liquid being below the melting point of ice, permitting the temperature of the slurry constituents to equalize whereby the frozen mass is warmed reducing the viscosity of its adherent concentrate, and during the equalization period said concentrate being dissolved in the slurry liquid increasing the density of said slurry liquid, and separating the slurry liquid from the frozen mass, the liquid body of juice used in slurrying each succeeding frozen mass being the separated slurry liquid from the preceding step, whereby the density of the separated slurry liquid is progressively increased.

13. Continuous method for producing a desired high solids concentrate of fruit or vegetable juices, comprising the preliminary stage of building up the density of a slurrying liquid by the method as claimed in claim 12, and then freezing and grinding other batches of juice, slurrying each with the liquid concentrate derived from the building up steps of claim 12 having a density less than that of the solids concentrate excluded from the ice of the frozen mass of said other batches and adhering to the ice particles, and less than the desired high density but sufficiently high to acquire the desired high density when mixed with the said adherent concentrate, said frozen masses being colder than the slurry liquid and the temperature of both being below the melting point of ice, causing the temperature of the slurry constituents to equalize, and separating the slurry liquid from each frozen mass.

14. Method for concentrating solutions comprising forming a slurry consisting of a ground mass of frozen solution, the frozen particles carrying adhering concentrate excluded from the frozen solid mass during the freezing process, mixed with liquid solution having the same constituents as said frozen solution, the concentration of the liquid solution being less than that of the concentrate adhering to the frozen particles, the frozen mass being colder than the admixed slurry liquid, and the slurry liquid being at sufficiently low temperature so as not to cause appreciable melting of the frozen particles, permitting the temperature of the slurry constituents to equalize whereby the frozen mass is warmed reducing the viscosity of its adherent concentrate, during the equalization period said concentrate being dissolved in said slurry liquid and increasing the concentration of said slurry liquid, and separating the slurry liquid from the frozen mass.

ROBERT E. WEBB.
FREDERICK W. BEDFORD.

REFERENCES CITED

The following references are of record in the file of this patent:

UNITED STATES PATENTS

| Number | Name | Date |
|---|---|---|
| 1,379,470 | Monti | May 24, 1921 |
| 2,354,633 | Bedford | July 25, 1944 |